United States Patent
Nakagawa et al.

(10) Patent No.: US 11,118,899 B2
(45) Date of Patent: Sep. 14, 2021

(54) WORK SUPPORT SYSTEM AND WORK SUPPORT METHOD

(71) Applicant: KAWASAKI JUKOGYO KABUSHIKI KAISHA, Kobe (JP)

(72) Inventors: Atsuki Nakagawa, Kakogawa (JP); Naohiro Nakamura, Kobe (JP); Masahiro Iwamoto, Kasai (JP); Shigekazu Shikoda, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/753,124

(22) PCT Filed: Oct. 11, 2018

(86) PCT No.: PCT/JP2018/037858
§ 371 (c)(1),
(2) Date: Apr. 2, 2020

(87) PCT Pub. No.: WO2019/087726
PCT Pub. Date: May 9, 2019

(65) Prior Publication Data
US 2020/0318950 A1    Oct. 8, 2020

(30) Foreign Application Priority Data
Nov. 2, 2017    (JP) .............................. JP2017-213085

(51) Int. Cl.
*G01B 11/24*    (2006.01)
*G01B 21/20*    (2006.01)
*H04N 5/74*    (2006.01)

(52) U.S. Cl.
CPC .............. *G01B 11/24* (2013.01); *G01B 21/20* (2013.01); *H04N 5/74* (2013.01)

(58) Field of Classification Search
CPC ........ G01B 11/24; G01B 21/20; G01B 11/00; G01B 21/00; B21D 22/18; H04N 5/74;
(Continued)

(56) References Cited

U.S. PATENT DOCUMENTS

2018/0286027 A1* 10/2018 Tobiason .......... H01L 27/14605
2019/0017815 A1  1/2019 Nakagawa et al.

FOREIGN PATENT DOCUMENTS

JP    2008-033049 A    2/2008
JP    5391564 B2    1/2014
(Continued)

*Primary Examiner* — Tri T Ton
(74) *Attorney, Agent, or Firm* — Oliff PLC

(57) ABSTRACT

A work support system includes a measurement apparatus measuring a state of each of multiple measurement points on an object surface of a workpiece, a projector apparatus, and an arithmetic apparatus creating a projection image of the projector apparatus based on a measurement result of the measurement apparatus. The arithmetic apparatus calculates a difference between a state measured by the measurement apparatus and a target state for each of the multiple measurement points, and creates the projection image such that a picture of a characteristic point representative of the difference at each of the multiple measurement points is projected by the projector apparatus at a position of a corresponding measurement point on the object surface of the workpiece.

14 Claims, 14 Drawing Sheets

(58) Field of Classification Search
CPC ...... H04N 9/31; H04N 9/3185; H04N 9/3194; B21C 51/00; G05B 19/401; G05B 19/4099; G05B 2219/45229; G06F 30/17
USPC .................................................. 356/600–640
See application file for complete search history.

(56) References Cited

FOREIGN PATENT DOCUMENTS

| | | |
|---|---|---|
| JP | 2014-035635 A | 2/2014 |
| JP | 2015-045751 A | 3/2015 |
| JP | 2015-149011 A | 8/2015 |
| JP | WO2016/157484 A1 | 6/2017 |
| WO | 2017/115620 A1 | 7/2017 |

* cited by examiner

VIEWPOINT OF THREE-DIMENSIONAL
MEASUREMENT APPARATUS

VIEWPOINT OF PROJECTOR APPARATUS

WORK SUPPORT SYSTEM AND WORK SUPPORT METHOD

TECHNICAL FIELD

The present invention relates to a work support system and a work support method for supporting a worker's work on a workpiece.

BACKGROUND ART

For example, a work support system described in Patent Document 1 three-dimensionally measures a current shape of a workpiece, calculates a difference between shape data of the workpiece obtained by the three-dimensional measurement and a target shape data, and images and presents the calculated difference to a worker via a display. As a result, the worker can determine details of work required for obtaining a target shape, i.e., a portion of the workpiece to be subjected to the work (to be processed) and an amount of the work (amount of the process).

PRIOR ART DOCUMENT

Patent Document

Patent Document 1: WO 2017/115620

SUMMARY OF THE INVENTION

Problem to be Solved by the Invention

However, in the case of the work support system described in Patent Document 1, the worker is required to take his/her eyes off the workpiece to check the display. Additionally, when the shape of the workpiece is a shape having a small number of characteristic portions, for example, a flat-plate shape, the worker may not understand which portion of the workpiece displayed on a display screen corresponds to which portion of the actual workpiece. Therefore, the worker may take time to determine details of work on the workpiece.

Therefore, a problem to be solved by the present invention is to support a worker's work on a workpiece so as to reduce a time required for the worker to determine details of work on the workpiece.

Means for Solving Problem

To solve the technical problem described above, an aspect of the present invention provides a work support system supporting a worker's work on a workpiece, comprising:
a measurement apparatus measuring a state of each of multiple measurement points on an object surface of the workpiece;
a projector apparatus arranged at a position different from the measurement apparatus such that the object surface is present within a projection range; and
an arithmetic apparatus creating a projection image of the projector apparatus based on a measurement result of the measurement apparatus, wherein
the arithmetic apparatus calculates a difference between a state measured by the measurement apparatus and a target state for each of the multiple measurement points, and wherein
the arithmetic apparatus creates the projection image such that a picture of a characteristic point representative of the difference at each of the multiple measurement points is projected by the projector apparatus at a position of a corresponding measurement point on the object surface of the workpiece.

Another aspect of the present invention provides a work support method of supporting a worker's work on a workpiece, comprising:
measuring a state of each of multiple measurement points on an object surface of the workpiece with a measurement apparatus; and creating based on a measurement result of the measurement apparatus a projection image of a projector apparatus arranged at a position different from the measurement apparatus such that the object surface is present within a projection range, wherein
the projection image is created by
calculating a difference between a state measured by the measurement apparatus and a target state for each of the multiple measurement points, and
creating the projection image such that a picture of a characteristic point representative of the difference at each of the multiple measurement points is projected by the projector apparatus at a position of a corresponding measurement point on the object surface of the workpiece.

Effect of the Invention

According to the present invention, the worker's work on the workpiece can be supported so as to reduce a time required for the worker to determine details of work on the workpiece.

MODES FOR CARRYING OUT THE INVENTION

Figure 1:
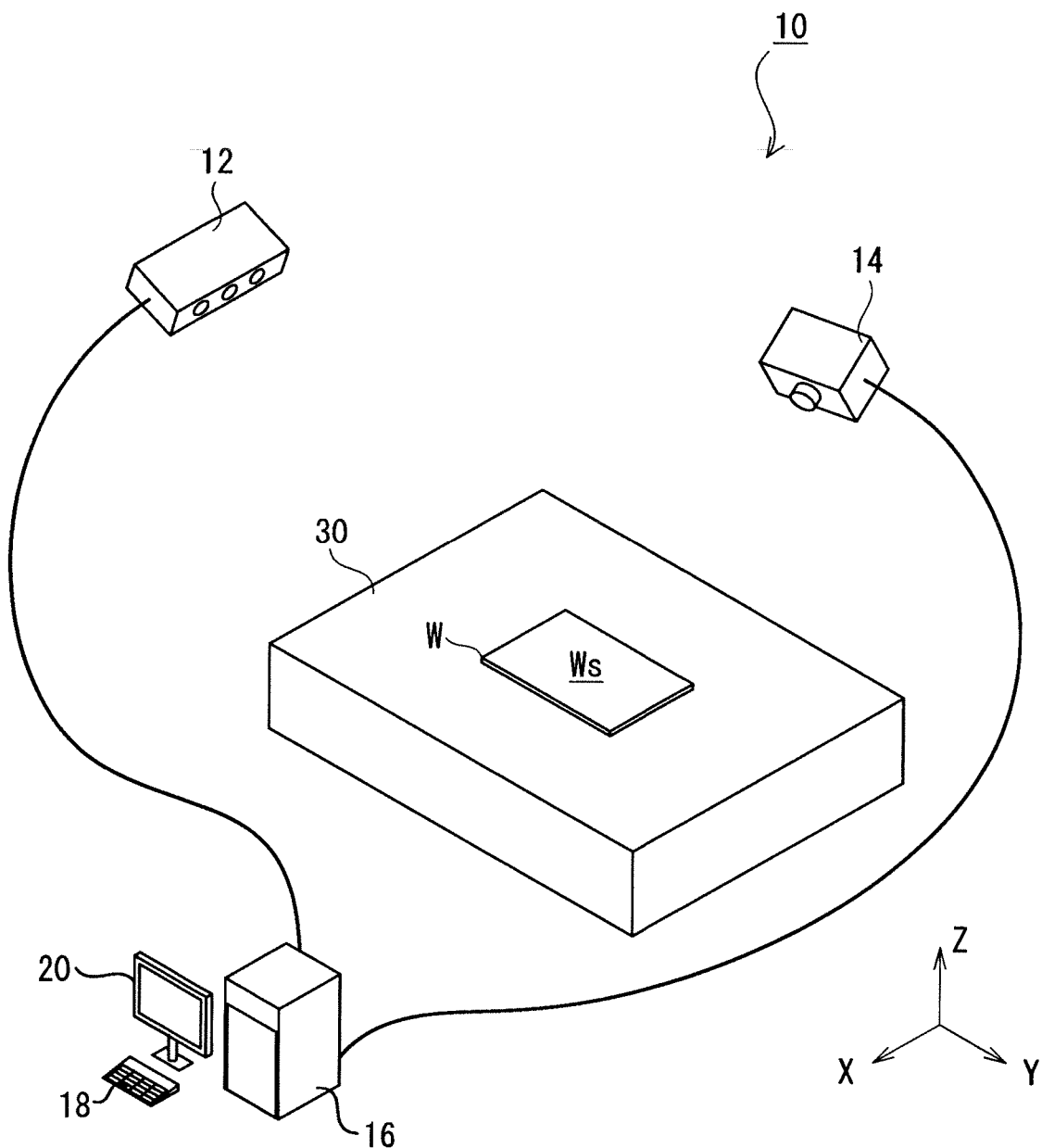
FIG. 1 is a perspective view schematically showing a configuration of a work support system according to a first embodiment of the present invention.

An aspect of the present invention provides a work support system supporting a worker's work on a workpiece, comprising a measurement apparatus measuring a state of each of multiple measurement points on an object surface of the workpiece, a projector apparatus arranged at a position different from the measurement apparatus such that the object surface is present within a projection range, and an arithmetic apparatus creating a projection image of the projector apparatus based on a measurement result of the measurement apparatus, wherein the arithmetic apparatus calculates a difference between a state measured by the measurement apparatus and a target state for each of the multiple measurement points, and wherein the arithmetic apparatus creates the projection image such that a picture of a characteristic point representative of the difference at each of the multiple measurement points is projected by the projector apparatus at a position of a corresponding measurement point on the object surface of the workpiece.

According to an aspect as described above, the worker's work on the workpiece can be supported so as to reduce a time required for the worker to determine details of work on the workpiece.

The arithmetic apparatus may include a difference map creating part calculating a difference between the state measured by the measurement apparatus and the target state for each of the multiple measurement points and creating a first difference map from the viewpoint of the measurement apparatus acquired by imaging a distribution of difference on the object surface as an image on a first plane orthogonal to a first view direction of the measurement apparatus to the object surface, a difference map converting part performing image conversion of the first difference map based on a positional relationship between the measurement apparatus and the projector apparatus into an image on a second plane orthogonal to a second view direction of the projector apparatus to the object surface and thereby creating a second difference map from the viewpoint of the projector apparatus, and a projection image creating part creating the projection image including the second difference map so that a picture of the second difference map is overlaid on the object surface.

The arithmetic apparatus may include a projection image correcting part correcting the projection image through image conversion so that the picture of the second difference map is overlaid in a matched manner on the object surface. As a result, the picture of the second difference map can be overlaid in a matched manner on the object surface of the workpiece.

The arithmetic apparatus may include an input part for the worker adjusting the projection image so that the picture of the second difference map is overlaid in a matched manner on the object surface, and a correction conversion matrix calculating part calculating an image conversion matrix used for image conversion of the projection image based on the projection image before being adjusted by the worker and the projection image after being adjusted. As a result, the picture of the second difference map can be overlaid in a matched manner on the object surface of the workpiece.

The work support system may comprise at least four markers detachably attached to the object surface and used as a reference for alignment for the worker overlaying the picture of the second difference map in a matched manner on the object surface. This facilitates the worker's work of adjusting the projection image so that the picture of the second difference map is overlaid in a matched manner on the object surface of the workpiece.

The arithmetic apparatus may include a difference calculating part calculating a difference between the state measured by the measurement apparatus and the target state for each of the multiple measurement points, a 3D model creating part creating a 3D model of the workpiece having the state measured by the measurement apparatus, a texture creating part creating a texture of the 3D model in which a characteristic point representative of a difference at each of the multiple measurement points is drawn at a position of a corresponding measurement point on the 3D model, a 3D model image creating part setting a viewpoint for the 3D model so as to achieve the same positional relationship as the positional relationship of the projector apparatus relative to the workpiece and creating a two-dimensional picture of the 3D model viewed from the viewpoint, and a projection image creating part creating the projection image including the two-dimensional picture of the 3D model such that the two-dimensional picture of the 3D model is overlaid on the workpiece.

For example, the measurement apparatus may be a three-dimensional measurement apparatus measuring a position of each of multiple measurement points on an object surface of the workpiece.

For example, the projector apparatus may be arranged in a measurement range of the three-dimensional measurement apparatus, and the arithmetic apparatus may calculate a positional relationship between the three-dimensional measurement apparatus and the projector apparatus based on a position of the projector apparatus measured by the three-dimensional measurement apparatus.

Another aspect of the present invention provides a work support method of supporting a worker's work on a workpiece, comprising measuring a state of each of multiple measurement points on an object surface of the workpiece with a measurement apparatus, and creating based on a measurement result of the measurement apparatus a projection image of a projector apparatus arranged at a position different from the measurement apparatus such that the object surface is present within a projection range, wherein the projection image is created by calculating a difference between a state measured by the measurement apparatus and a target state for each of the multiple measurement points, and creating the projection image such that a picture of a characteristic point representative of the difference at each of the multiple measurement points is projected by the projector apparatus at a position of a corresponding measurement point on the object surface of the workpiece.

According to the other aspect described above, the worker's work on the workpiece can be supported so as to reduce a time required for the worker to determine details of work on the workpiece.

The projection image is created by creating a first difference map from the viewpoint of the measurement apparatus acquired by imaging a distribution of the difference on the object surface as an image on a first plane orthogonal to a first view direction of the measurement apparatus to the object surface, performing image conversion of the first difference map based on a positional relationship between the measurement apparatus and the projector apparatus into an image on a second plane orthogonal to a second view direction of the projector apparatus to the object surface and thereby creating a second difference map from the viewpoint of the projector apparatus, and creating the projection image including the second difference map so that a picture of the second difference map is overlaid on the object surface.

The projection image may be corrected through image conversion so that the picture of the second difference map is overlaid in a matched manner on the object surface. As a result, the picture of the second difference map can be overlaid in a matched manner on the object surface of the workpiece.

The projection image may be adjusted so that the picture of the second difference map is overlaid in a matched manner on the object surface, and an image conversion matrix used for image conversion of the projection image may be calculated based on the projection image before being adjusted and the projection image after being adjusted. As a result, the picture of the second difference map can be overlaid in a matched manner on the object surface of the workpiece.

At least four markers may detachably be attached to the object surface, and the least four markers may be used as a reference for alignment for overlaying the picture of the second difference map in a matched manner on the object surface. This facilitates the worker's work of adjusting the projection image so that the picture of the second difference map is overlaid in a matched manner on the object surface of the workpiece.

The projection image may be created by creating a 3D model of the workpiece having the state measured by the measurement apparatus, creating a texture of the 3D model in which a characteristic point representative of a difference at each of the multiple measurement points is drawn at a position of a corresponding measurement point on the 3D model, setting a viewpoint for the 3D model so as to achieve the same positional relationship as the positional relationship of the projector apparatus relative to the workpiece, creating a two-dimensional picture of the 3D model viewed from the viewpoint, and creating the projection image including the two-dimensional picture of the 3D model such that the two-dimensional picture of the 3D model is overlaid on the workpiece.

For example, the measurement apparatus may be a three-dimensional measurement apparatus measuring a position of each of multiple measurement points on an object surface of the workpiece.

For example, the projector apparatus may be arranged in a measurement range of the three-dimensional measurement apparatus, and a positional relationship between the three-dimensional measurement apparatus and the projector apparatus may be calculated based on a position of the projector apparatus measured by the three-dimensional measurement apparatus.

Embodiments of the present invention will now be described with reference to the drawings.

First Embodiment

Figure 2:
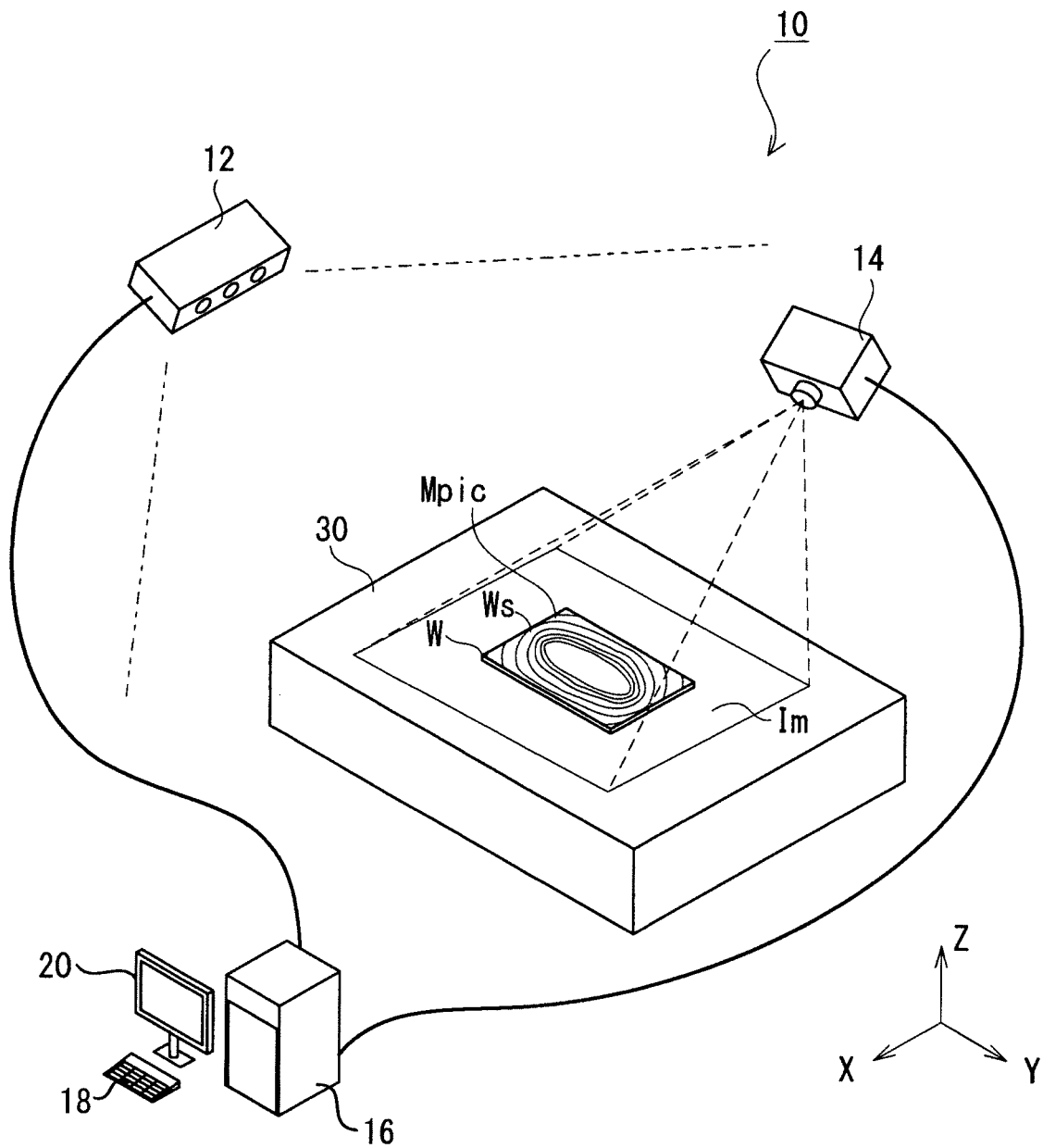
FIG. 2 is a perspective view of the work support system in a state with a picture of a difference map is overlaid on an object surface of a workpiece.
Figure 3:
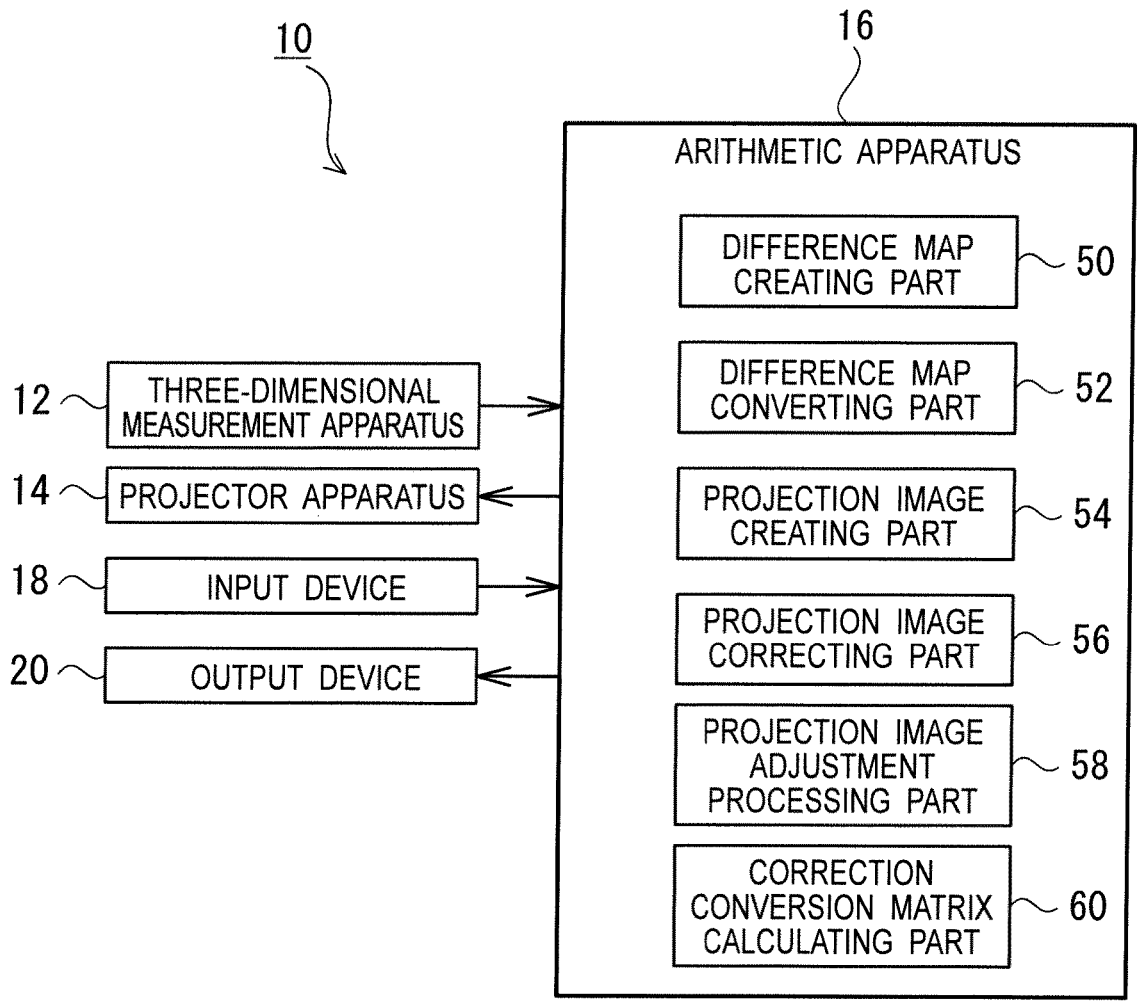
FIG. 3 is a block diagram of the work support system.

FIGS. 1 and 2 schematically show a configuration of a work support system according to a first embodiment of the present invention. FIG. 3 is a block diagram of the work support system. Although an X-Y-Z coordinate system is shown in the figures, this coordinate system is for facilitating understanding of the invention and does not limit the invention. The X-axis direction and the Y-axis direction are horizontal directions, and the Z-axis is a vertical direction.

A work support system 10 according to the first embodiment is configured to support a work of a worker using a press machine to deform a plate-shaped workpiece W. The workpiece W is set on a stage 30 of the press machine. The other constituent elements of the press machine such as a punch pressing and deforming the workpiece are not shown.

To assist the worker working on the workpiece W, the work support system 10 according to the first embodiment is configured to present to the worker a difference between a current shape of the workpiece W and a target shape (e.g., a completed shape). Specifically, as shown in FIG. 2, a difference map (image) indicative of a difference between the current shape and the target shape of an object surface Ws of the workpiece W is created, and a picture Mpic of the difference map is overlaid on the object surface Ws to provide information necessary for determining details of work to be performed by the worker (e.g., a portion to be pressed and an amount of pressing).

Therefore, as shown in FIG. 1, the work support system 10 according to the first embodiment includes a three-dimensional measurement apparatus 12 measuring the shape of the object surface Ws of the workpiece W that is a work object of a worker, a projector apparatus 14 for projection toward the object surface Ws of the workpiece W, an arithmetic apparatus 16 connected thereto, an input device 18 such as a mouse or a keyboard for the worker inputting an instruction to the arithmetic apparatus 16, and an output device 20 such as a display or a printer for outputting information to the worker.

As shown in FIG. 2, the three-dimensional measurement apparatus 12 measures the shape of the object surface Ws of the workpiece W. Specifically, the three-dimensional measurement apparatus 12 measures positions of multiple measurement points on the object surface Ws of the workpiece W as respective states thereof. For example, the three-dimensional measurement apparatus 12 is a 3D laser scanner scanning the workpiece W with a laser beam to measure the shape of the object surface Ws of the workpiece W. The three-dimensional measurement apparatus 12 according to the first embodiment of the present invention is not limited in terms of the shape measurement method as long as the shape of the object surface Ws of the workpiece W can be measured. Although the reason will be described later, the projector apparatus 14 is arranged in a measurement range of the three-dimensional measurement apparatus 12. Shape data of the object surface Ws of the workpiece W measured by the three-dimensional measurement apparatus 12 is transmitted to the arithmetic apparatus 16.

As shown in FIG. 2, the projector apparatus 14 is configured to project a projection image including the difference map toward the workpiece W such that the picture Mpic of the difference map is overlaid on the object surface Ws of the workpiece W. The projection image for this purpose is transmitted from the arithmetic apparatus 16 to the projector apparatus 14.

The arithmetic apparatus 16 is a PC (personal computer), for example, and is configured to acquire the shape data of the object surface Ws of the workpiece W, which is a measurement result of the three-dimensional measurement apparatus 12, from the three-dimensional measurement apparatus 12, and to create a projection image (data) of the projector apparatus 14 based on the shape data (or has a program installed therein for this purpose).

As shown in FIG. 3, the arithmetic apparatus 16 includes a difference map creating part 50 creating a difference map (first difference map) based on the shape data acquired from the three-dimensional measurement apparatus 12, a difference map converting part 52 converting the first difference map into a second difference map, a projection image creating part 54 creating a projection image of the projector apparatus 14 including the second difference map, and a projection image correcting part 56 correcting the projection image (or includes these parts as a program).

The difference map creating part 50 of the arithmetic apparatus 16 is configured to first calculate a difference between the shape data (measured shape data) acquired from the three-dimensional measurement apparatus 12 and target shape data of the object surface Ws of the workpiece W. The target shape data of the object surface Ws of the workpiece W is 3D CAD data of a completed product of the workpiece W, for example, and is stored in a storage part (e.g., a hard disk) (not shown) of the arithmetic apparatus 16, for example.

The difference (data) between the measured shape data of the object surface Ws of the workpiece W and the target shape data is obtained by appropriately overlaying these data by using a best-fit technique, for example, and calculating a difference between a position of each of the multiple measurement points on the target shape data and a position of a corresponding measurement point on the measured shape data. Therefore, the obtained difference data shows a distribution of respective differences of the multiple measurement points on the object surface Ws of the workpiece W. The work support system according to the first embodiment may use any calculation method as long as the system can calculate the difference between the measured shape data and the target shape data of the object surface Ws of the workpiece W.

Figure 4:
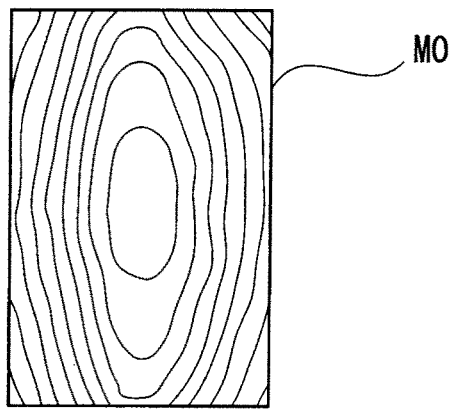
FIG. 4 is a view showing an exemplary difference map

FIG. 4 shows a difference map M0 of a two-dimensional image created based on the obtained difference data. The difference map M0 is an image of a distribution of respective differences in position in a workpiece thickness direction of the multiple measurement points on the object surface Ws of the workpiece W. Specifically, in the difference map M0, the differences are represented by different characteristic points (e.g., different color, different brightness) depending on the magnitude thereof.

In the case of the first embodiment, in the difference map M0, a region including measurement points having a substantially equal magnitude of difference is colored with the same color. Therefore, each of the regions substantially different in magnitude of difference is colored with a different color and thereby represented in a distinguishable manner. The difference map M0 is a contour diagram in which boundaries between the regions represent contour lines. The difference map M0 allows the worker to determine a portion of the workpiece W to be pressed to achieve the target shape and an amount of pressing thereof in a short time.

Figure 5:
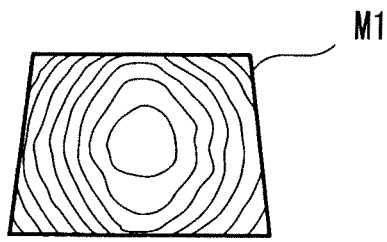
FIG. 5 is a view showing a first difference map from a viewpoint of a three-dimensional measurement apparatus.

Even if the projector apparatus 14 projects the difference map M0 shown in FIG. 4 directly as a projection image, the picture thereof is not overlaid (not projected) in a matched state on the object surface Ws of the workpiece W. Therefore, as shown in FIG. 2, the difference map M0 must be converted so that the picture Mpic is overlaid in a matched state on the object surface Ws. Therefore, the difference map creating part 50 of the arithmetic apparatus 16 converts the difference map M0 into a difference map (first difference map) from the viewpoint of the three-dimensional measurement apparatus 12 (i.e., creates the first difference map) at a preliminary step of creation of a projection image. For example, a first difference map M1 as shown in FIG. 5 is created. This will be described with reference to FIGS. 6 and 7.

Figure 6:
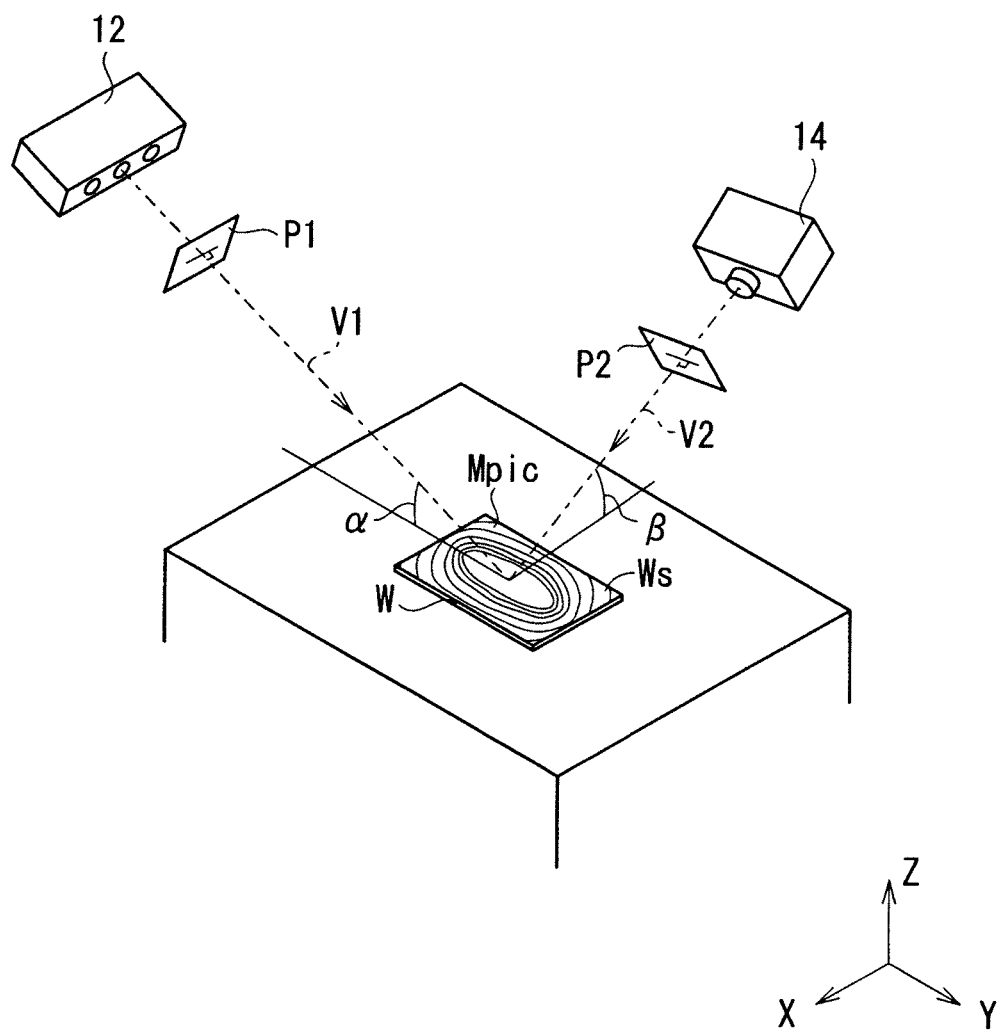
FIG. 6 is a perspective view of the work support system for explaining a procedure of creating a projection image including the difference map such that a picture of the difference map is overlaid on the object surface of the workpiece.
Figure 7:
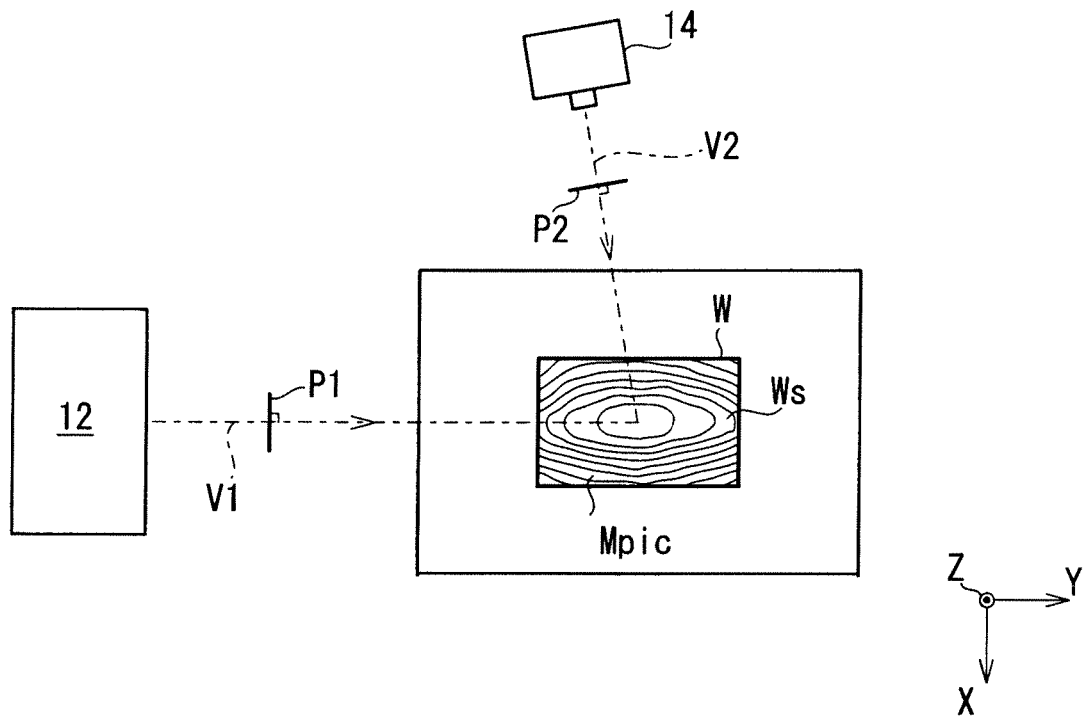
FIG. 7 is a top view of the work support system for explaining the procedure of creating a projection image including the difference map such that a picture of the difference map is overlaid on the object surface of the workpiece.

FIG. 6 is a perspective view of the work support system for explaining a procedure of creating the projection image including the difference map such that a picture of the difference map is overlaid on the object surface of the workpiece. FIG. 7 is a top view of the work support system.

The first difference map M1 from the viewpoint of the three-dimensional measurement apparatus is acquired by imaging the distribution of difference in the position in the workpiece thickness direction on the object surface of the workpiece W as an image on a first plane P1 orthogonal to a first view direction (collimation direction) V1 of the three-dimensional measurement apparatus 12 to the object surface Ws of the workpiece W. Therefore, the first difference map M1 corresponds to a result of image conversion (e.g., projection conversion) of the difference map M0 into an image on the first plane P1. As used herein, the "image conversion" refers to processing an image so that a shape shown in the image is deformed. The first difference map M1 corresponds to the picture Mpic of the difference map overlaid in a matched state on the object surface Ws of the workpiece W and viewed in the first view direction V1 as shown in FIG. 6.

Figure 8:
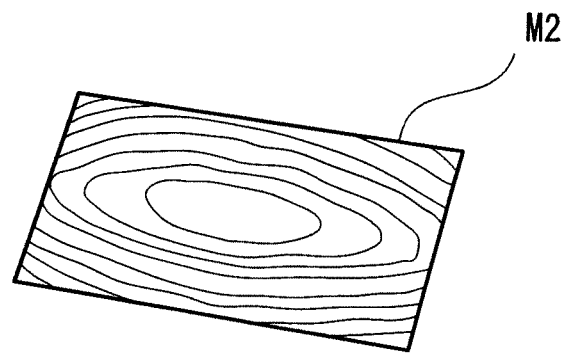
FIG. 8 is a view showing a second difference map from a viewpoint of a projector apparatus.

The difference map converting part 52 of the arithmetic apparatus 16 is configured to convert the first difference map M1 from the viewpoint of the three-dimensional measurement apparatus 12 created by the difference map creating part 50 into a difference map (second difference map) from the viewpoint of the projector apparatus 14. For example, the second difference map M2 as shown in FIG. 8 is created.

As shown in FIGS. 6 and 7, the second difference map M2 from the viewpoint of the projector apparatus is an image on a second plane P2 orthogonal to a second view direction (collimation direction) V2 of the projector apparatus 14 to the object surface Ws of the workpiece W and is obtained through image conversion (e.g., projection conversion) of the first difference map M1 on the first plane P1 into the image on the second plane P2.

To obtain the second difference map M2 through image conversion of the first difference map M1 on the first plane P1 into an image on the second plane P2, i.e., to obtain an image conversion matrix (e.g., a projection conversion matrix) for the image conversion from the image on the first plane P1 into the image on the second plane P2, the difference map converting part 52 of the arithmetic apparatus 16 needs a positional relationship between the first plane P1 and the second plane P2.

Specifically, since the three-dimensional measurement apparatus 12 and the projector apparatus 14 are each directed to the object surface Ws of the workpiece W as shown in FIGS. 6 and 7, the positional relationship between the first plane P1 and the second plane P2 can be known if a positional relationship between the three-dimensional measurement apparatus 12 and the projector apparatus 14 is known. As a result, the image conversion matrix from the image on the first plane P1 into the image on the second plane P2 can be obtained.

The positional relationship between the three-dimensional measurement apparatus 12 and the projector apparatus 14 can be known through measurement. Alternatively, a predetermined positional relationship is achieved by disposing the three-dimensional measurement apparatus 12 and the projector apparatus 14 in accordance with a predetermined layout.

Instead, the three-dimensional measurement apparatus 12 may measure the position of the projector apparatus 14 to allow the arithmetic apparatus 16 to calculate the positional relationship between the three-dimensional measurement apparatus 12 and the projector apparatus 14 based on the measured position of the projector apparatus 14. In this case, as long as the projector apparatus 14 is arranged in the measurement range of the three-dimensional measurement apparatus 12, at least one of the positions of the three-dimensional measurement apparatus 12 and the projector apparatus 14 can be changed as necessary.

Therefore, the difference map converting part 52 of the arithmetic apparatus 16 calculates the positional relationship between the first plane P1 and the second plane P2 based on the positional relationship between the three-dimensional measurement apparatus 12 and the projector apparatus 14 obtained in advance and performs the image conversion of the first difference map M1 on the first plane P1 into an image on the second plane P2, thereby creating the second difference map M2. The second difference map M2 corresponds to the picture Mpic of the difference map overlaid in a matched state on the object surface Ws of the workpiece W and viewed in the second view direction V2 as shown in FIG. 6.

Figure 9:
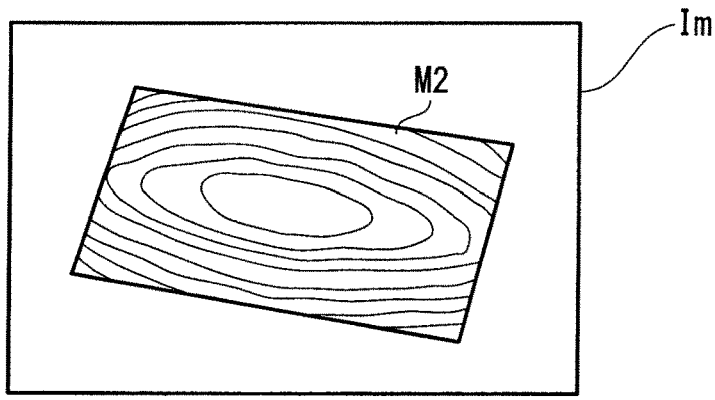
FIG. 9 is a view showing an exemplary projection image.

As shown in FIG. 9, The projection image creating part 54 of the arithmetic apparatus 16 creates a projection image Im (data) including the second difference map M2 created by the difference map converting part 52. The projector apparatus 14 can project this projection image Im to overlay the picture Mpic of the second difference map M2 on the object surface Ws of the workpiece W.

Figure 10:
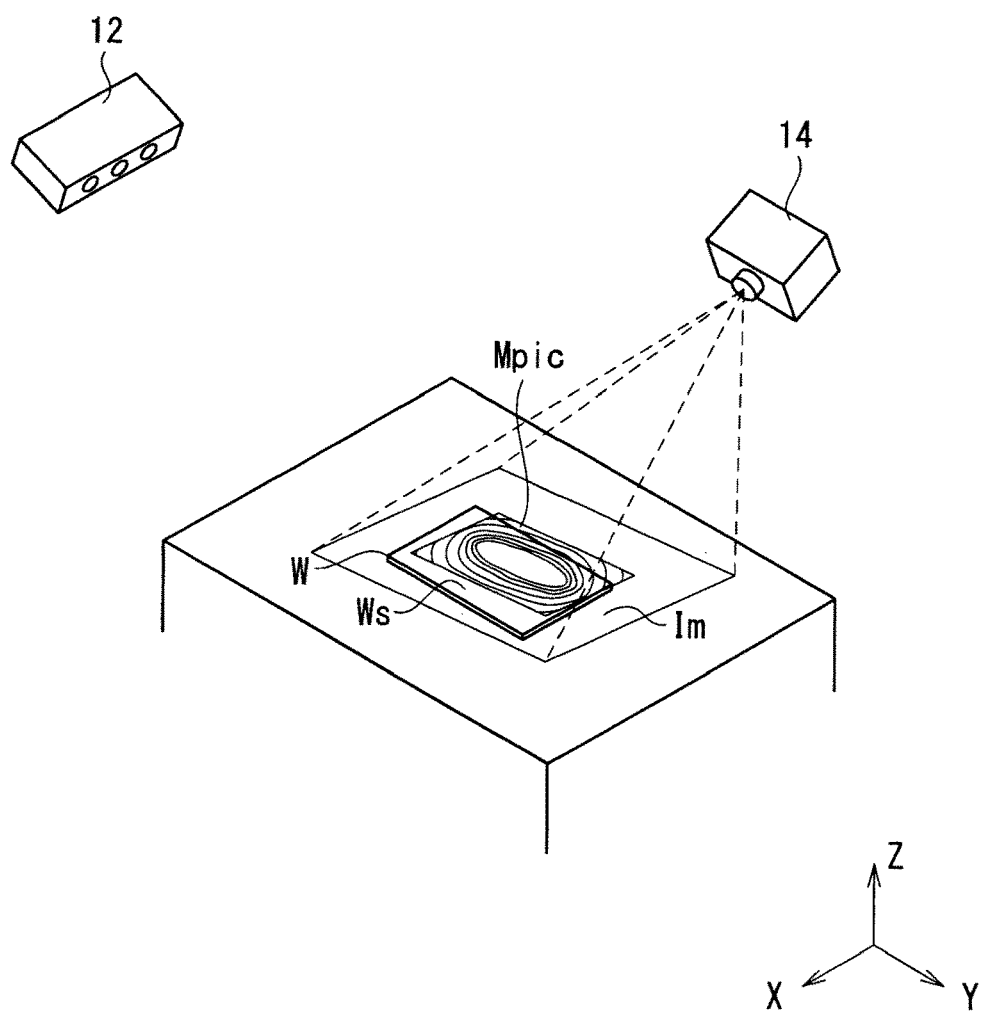
FIG. 10 is a view showing a state in which a picture of the second difference map is offset relative to the object surface of the workpiece.

However, as shown in FIG. 10, when the projector apparatus 14 projects the projection image Im, the picture Mpic of the second difference map M2 in the projection image Im may be offset relative to the object surface Ws of the workpiece W and may not overlaid in a matched state. This may occur due to an error in the calculation of the positional relationship between the three-dimensional measurement apparatus 12 and the projector apparatus 14, an inclination of an optical axis of the projector apparatus 14 relative to a main body, a projection magnification, etc. Additionally, as shown in FIG. 6, this may also occur when an angle α formed by the first view direction V1 of the three-dimensional measurement apparatus 12 and the object surface Ws of the workpiece W is different from an angle β formed by the second view direction V2 of the projector apparatus 14 and the object surface Ws.

The projection image correcting part 56 of the arithmetic apparatus 16 shown in FIG. 3 is configured to correct the projection image Im such that the picture Mpic of the second difference map M2 is overlaid in a matched manner on the object surface Ws of the workpiece W.

Specifically, the projection image correcting part 56 makes a correction through image conversion (e.g., projection conversion) of the projection image Im such that the picture Mpic of the second difference map M2 is overlaid in a matched manner on the object surface Ws of the workpiece W. In the case of the first embodiment, the image conversion matrix (e.g., projection conversion matrix) used for the image conversion is calculated through a calibration work by the worker.

The worker adjusts the projection image Im for the calibration operation so that the picture Mpic of the second difference map M2 is overlaid in a matched manner on the object surface Ws of the workpiece W. Therefore, the arithmetic apparatus 16 includes a projection image adjustment processing part 58.

For example, the projection image adjustment processing part 58 displays the projection image Im projected on the workpiece W as shown in FIG. 10 on the output device 20 (display). The worker operates the input device 18 (a mouse or a keyboard) etc. for the adjustment processing of the projection image Im displayed on the output device 20. For example, the worker performs an image adjustment such as stretch processing, resizing, and rotation. The projection image adjustment processing part 58 provides an interface for performing the image adjustment to the worker.

A camera may be used for photographing the workpiece W while the projection image Im is projected, and an image photographed by the camera may be displayed on the output device 20 (display). The worker can adjust the projection image Im while watching the object surface Ws of the workpiece W shown on the output device 20.

When the adjustment of the projection image Im by the worker is completed, i.e., when the picture Mpic of the second difference map M2 is overlaid in a matched manner on the object surface Ws of the workpiece W, a correction conversion matrix calculating part 60 of the arithmetic apparatus 16 shown in FIG. 3 calculates a correction conversion matrix.

Specifically, the correction conversion matrix calculating part 60 calculates an image conversion matrix used when the projection image correcting part 56 performs the image conversion of the projection image Im. The correction conversion matrix calculating part 60 is configured to calculate the image conversion matrix based on the projection image Im before being adjusted by the worker and the projection image Im after being adjusted. Therefore, the image conversion matrix for performing image conversion from the projection image Im before adjustment to the projection image Im after adjustment is calculated.

By correcting the projection image Im with the image conversion matrix calculated by the correction conversion matrix calculating part 60, the projection image correcting part 56 can overlay the picture Mpic of the second difference map M2 offset as shown in FIG. 10 in a matched state on the object surface Ws of the workpiece W as shown in FIG. 2.

The object surface Ws of the workpiece W may not have a rectangular shape including characteristic portions such as four corners distinguishable from the other portions and may have a shape with a small number of characteristic portions such as a circular shape. In this case, to facilitate overlaying of the picture of the second difference map in a matched manner on the object surface Ws of the workpiece W, i.e., to facilitate the worker's adjustment work on the projection image, a marker may be used as a reference for alignment.

Figure 11:
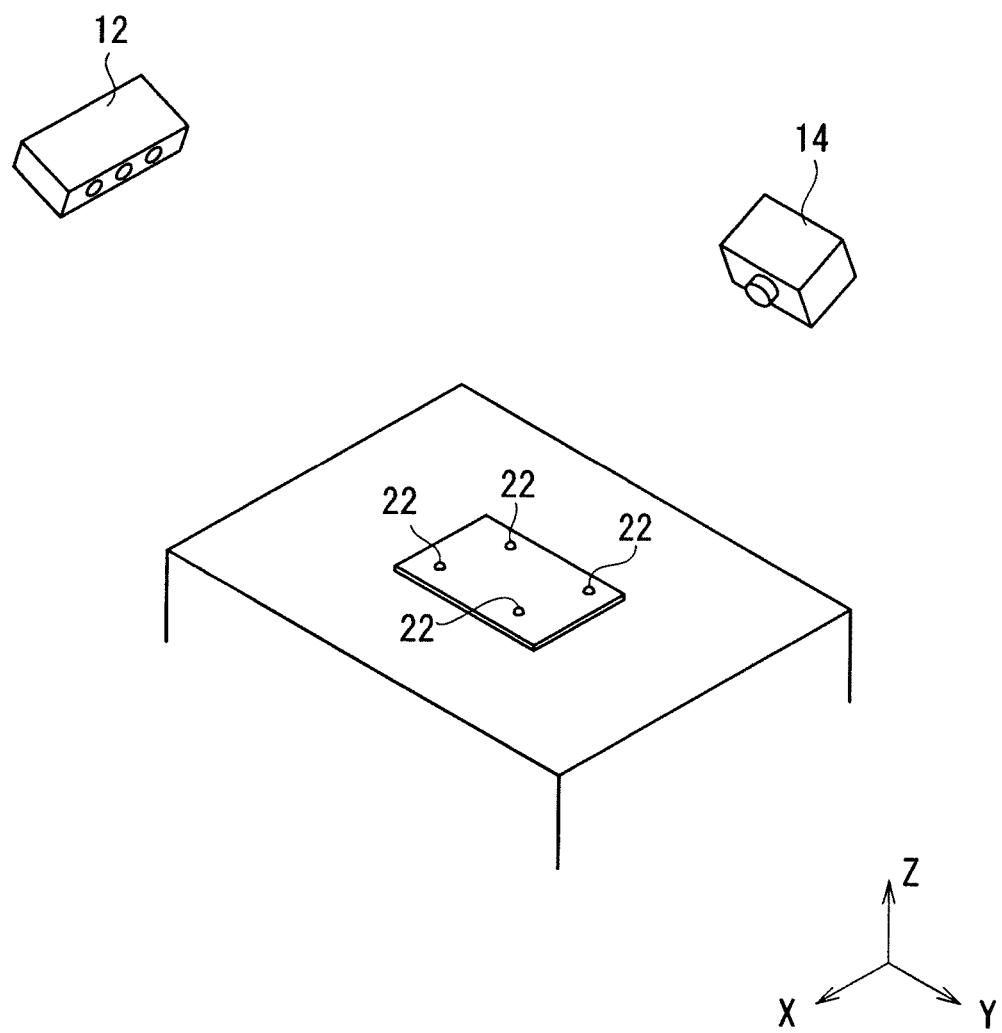
FIG. 11 is view showing a state of the workpiece to which multiple markers are attached.

For example, as shown in FIG. 11, at least four markers 22 are detachably disposed on the object surface Ws of the workpiece W. In this case, the second difference map M2 is created while the at least four markers 22 are attached to the workpiece W. Therefore, the three-dimensional measurement apparatus 12 measures the workpiece W while the markers 22 are attached, and the second difference map M2 is created based on the measurement result. The second difference map M2 created in this way has the at least four markers 22 appearing as characteristic points. The worker adjusts the projection image Im to align the at least four characteristic points (i.e., the pictures of the at least four markers 22) in the second difference map M2 with the at least four actual markers 22 attached to the workpiece W. As a result, the worker can easily create the projection image Im in which the picture Mpic of the second difference map M2 is overlaid in a matched manner on the object surface Ws of the workpiece W. Based on the created projection image Im, the correction conversion matrix calculating part 60 of the arithmetic apparatus 16 then calculates the image conversion matrix as the correction conversion matrix. After calculation of the image conversion matrix, the markers 22 are removed from the workpiece W. If not hindering the work on the workpiece W, the markers 22 may be kept attached to the workpiece W.

The worker's calibration work (the work of attaching/detaching the markers 22 when the markers 22 are used) performed for calculating the image conversion matrix for correcting the projection image Im as described above is performed when the positional relationship is changed among the three-dimensional measurement apparatus 12, the projector apparatus 14, and the workpiece W. Therefore, if the positional relationship thereof is not changed, the image conversion matrix for correcting the projection image may be calculated only once.

A flow of the work support of the work support system 10 having the configuration described above will be described with reference to a flowchart shown in FIG. 12.

Figure 12:
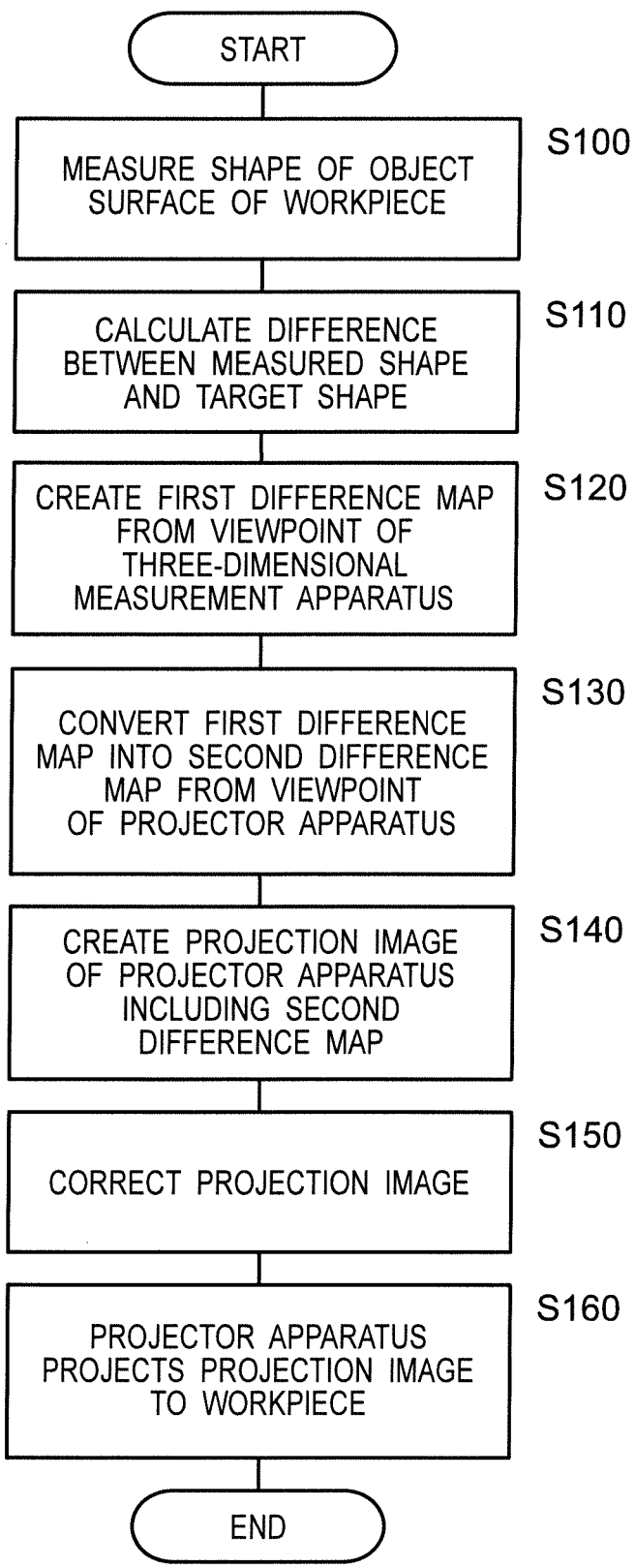
FIG. 12. is a flowchart showing a flow of work support of the work support system according to the first embodiment.

The work support of the work support system 10 shown in FIG. 12 is performed each time the worker completes one step for the workpiece W (e.g., a work of pressing one portion of the workpiece W), for example. Alternatively, the work support may be performed in accordance with a request from the worker.

As shown in FIG. 12, first, at first step S100, the shape of the object surface Ws of the workpiece W is measured by the three-dimensional measurement apparatus 12. As a result, the measured shape data of the object surface Ws of the workpiece W is acquired.

At step S110, the arithmetic apparatus 16 calculates a difference between the measured shape data of the object surface Ws of the workpiece W measured and acquired at step S100 and the target shape data.

Subsequently, at step S120, the arithmetic apparatus 16 (the difference map creating part 50) creates the first difference map M1 from the viewpoint of the three-dimensional measurement apparatus 12 as shown in FIG. 5 based on the difference calculated at step S110.

At step S130, the arithmetic apparatus 16 (the difference map converting part 52) converts the first difference map M1 created at step S120 into the second difference map M2 from the viewpoint of the projector apparatus 14 as shown in FIG. 8.

At step S140, the arithmetic apparatus 16 (the projection image creating part 54) creates the projection image Im of the projector apparatus 14 as shown in FIG. 9 including the second difference map M2 created at step S130.

At step S150, the arithmetic apparatus 16 (the projection image correcting part 56) corrects the projection image Im created at step S140 such that the second difference map M2 included in the projection image Im is overlaid in a matched manner on the object surface Ws of the workpiece W.

At step S160, the projection image Im corrected at step S150 is transmitted from the arithmetic apparatus 16 to the projector apparatus 14, and the projection image Im is projected toward the workpiece W. As a result, as shown in FIG. 2, the picture Mpic of the second difference map M2 is overlaid in a matched manner on the object surface Wa of the workpiece W.

According to the first embodiment as described above, the worker's work on the workpiece can be supported so as to reduce a time required for the worker to determine details of work on the workpiece.

Specifically, the worker can consider details of work for shaping the workpiece W into the target shape while referring to the picture Mpic of the second difference map M2 overlaid in a matched manner on the object surface Ws of the workpiece W as shown in FIG. 2. Specifically, a picture of a characteristic point (e.g., a color) representative of a difference from the target shape is projected by the projector apparatus 14 at each of multiple measurement points on the object surface Ws of the workpiece W. Therefore, the worker can know the difference from the target shape for each of the multiple portions on the object surface Ws of the workpiece W and consequently can consider the details of work for shaping the workpiece W into the target shape.

The worker can see the second difference map M2 that is information for determining the details of work and the actual workpiece W at the same time. Furthermore, since the picture Mpic of the second difference map M2 is overlaid on the actual workpiece W, the worker can immediately know a necessary work and an amount of work for a certain portion of the workpiece W from the picture Mpic of the second difference map M2. As a result, the worker can determine the details of work in a shorter time as compared to when the second difference map M2 is presented to the worker via the output device 20 such as a display.

Second Embodiment

In the case of the first embodiment described above, the worker's adjustment work on the projection image may be required for overlaying the picture of the second difference map in the projection image of the projector apparatus on the object surface Ws of the workpiece W in a matched manner. As a result, the worker may take time to consider the details of work for shaping the workpiece W into the target shape. As a countermeasure, an arithmetic apparatus in a second embodiment is configured to create a projection image not substantially requiring the worker's adjustment work.

Figure 13:
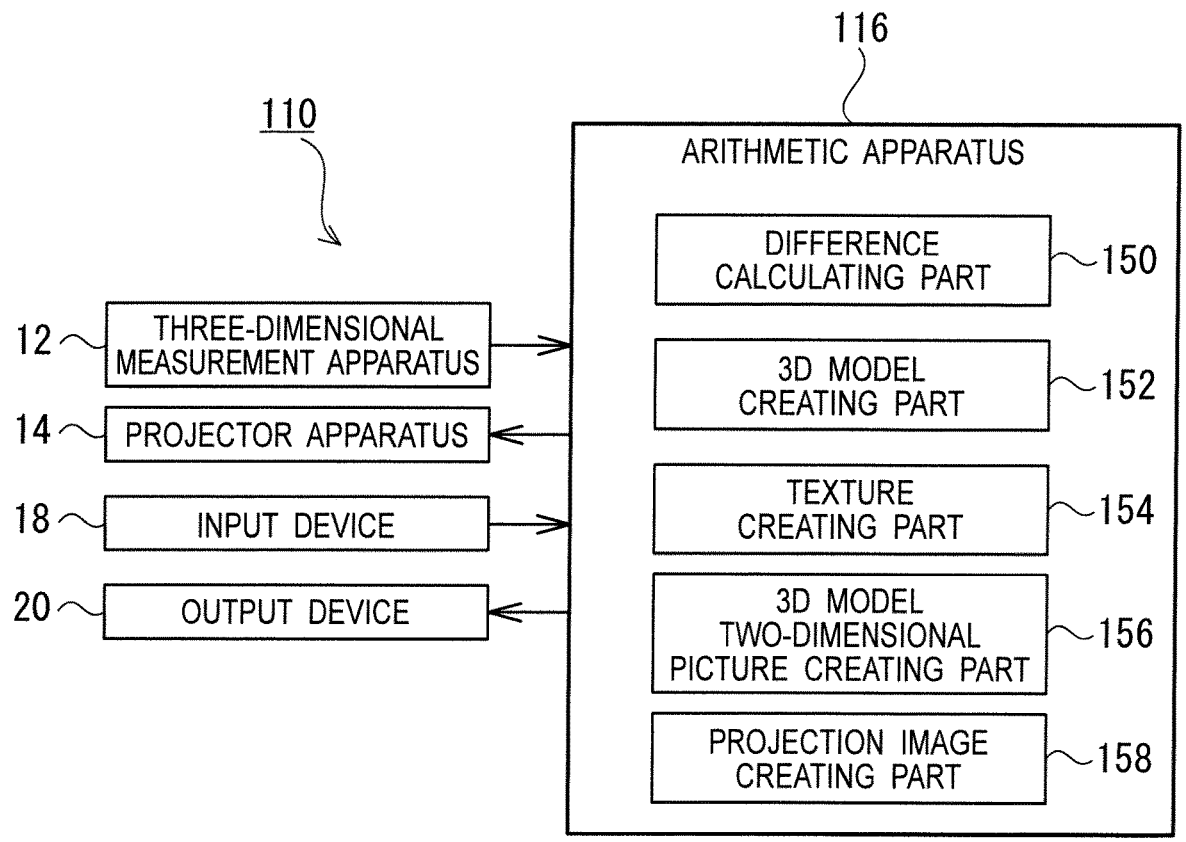
FIG. 13 is a block diagram of a work support system according to a second embodiment of the present invention.

FIG. 13 is a block diagram of a work support system according to the second embodiment. The same reference numerals are given to constituent elements in the second embodiment that are substantially the same as the constituent elements in the first embodiment described above.

An arithmetic apparatus 116 of a work support system 110 according to the second embodiment shown in FIG. 13 is a PC (personal computer), for example, and is configured to acquire the shape data of the workpiece W, which is a measurement result of the three-dimensional measurement apparatus 12, from the three-dimensional measurement apparatus 12, and to create a projection image (data) of the projector apparatus 14 based on the shape data (or has a program installed therein for this purpose).

As shown in FIG. 13, the arithmetic apparatus 116 includes a difference calculating part 150 calculating a difference between the measured shape data acquired from the three-dimensional measurement apparatus 12 and the target shape data, a 3D model creating part 152 creating a 3D model of the workpiece, a texture creating part 154 creating a texture of the 3D model, a 3D model two-dimensional picture creating part 156 creating a two-dimensional picture of the 3D model of the workpiece, and a projection image creating part 158 creating a projection image of the projector apparatus 14 including the two-dimensional picture of the 3D model (or includes these parts as a program).

The difference calculating part 150 of the arithmetic apparatus 116 calculates a difference between each of multiple measurement points in the measured shape data of the object surface Ws of the workpiece W acquired from the three-dimensional measurement apparatus 12 and a corresponding measurement point in the target shape data of the object surface Ws of the workpiece W.

The 3D model creating part 152 of the arithmetic apparatus 116 creates a 3D model of the workpiece W based on the measured shape data acquired from the three-dimensional measurement apparatus 12.

The texture creating part 154 of the arithmetic apparatus 116 creates a texture of the 3D model created by the 3D model creating part 152.

Figure 14:
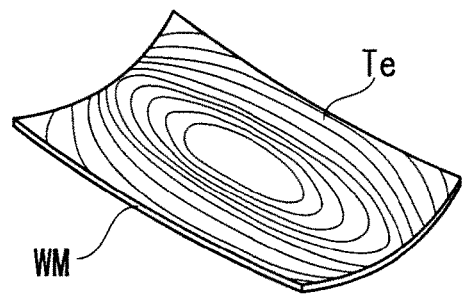
FIG. 14 is a view showing a 3D model of the workpiece.

FIG. 14 shows a 3D model including a texture. As shown in FIG. 14, a texture Te (surface) of a 3D model WM represents a difference between the measured shape data and the target shape data of the workpiece W.

Specifically, the texture Te of the 3D model WM is created such that a characteristic point (e.g., different color, different brightness) is drawn at a position of a measurement point on the 3D model WM corresponding to each of the multiple measurement points on the measured shape data of the workpiece W so as to represent a difference at the measurement point on the measured shape data.

In the case of the second embodiment, the difference is represented in the texture Te (surface) of the 3D model WM by a different characteristic point (e.g., different color, different brightness) depending on the magnitude thereof.

In the case of the second embodiment, in the texture Te of the 3D model WM, a region including measurement points having a substantially equal magnitude of difference is colored with the same color. Therefore, each of the regions substantially different in magnitude of difference is colored with a different color and thereby represented in a distinguishable manner. Boundaries between the regions represent contour lines.

Unlike the difference map that is a two-dimensional image in the first embodiment described above, the distribution of difference is drawn on the texture Te having a three-dimensional shape in the 3D model WM in the case of the second embodiment.

The 3D model two-dimensional picture creating part 156 of the arithmetic apparatus 116 creates a two-dimensional picture of the 3D model WM of the workpiece W. Specifically, the 3D model two-dimensional picture creating part 156 sets a viewpoint for the 3D model WM of the workpiece W so as to achieve the same positional relationship as the positional relationship of the projector apparatus 14 to the workpiece W. The 3D model two-dimensional picture creating part 156 creates the two-dimensional picture of the 3D model WM viewed from the set viewpoint. In other words, the two-dimensional picture to be created is substantially the same as an image shown in a photographed image obtained when a camera disposed at the viewpoint photographs the 3D model WM. The two-dimensional picture of the 3D model WM can be created by projection conversion of the 3D model onto a plane orthogonal to a straight line connecting the viewpoint and the 3D model WM. The positional relationship of the projector apparatus 14 to the workpiece W can be obtained by the three-dimensional measurement apparatus 12, for example.

Figure 15:
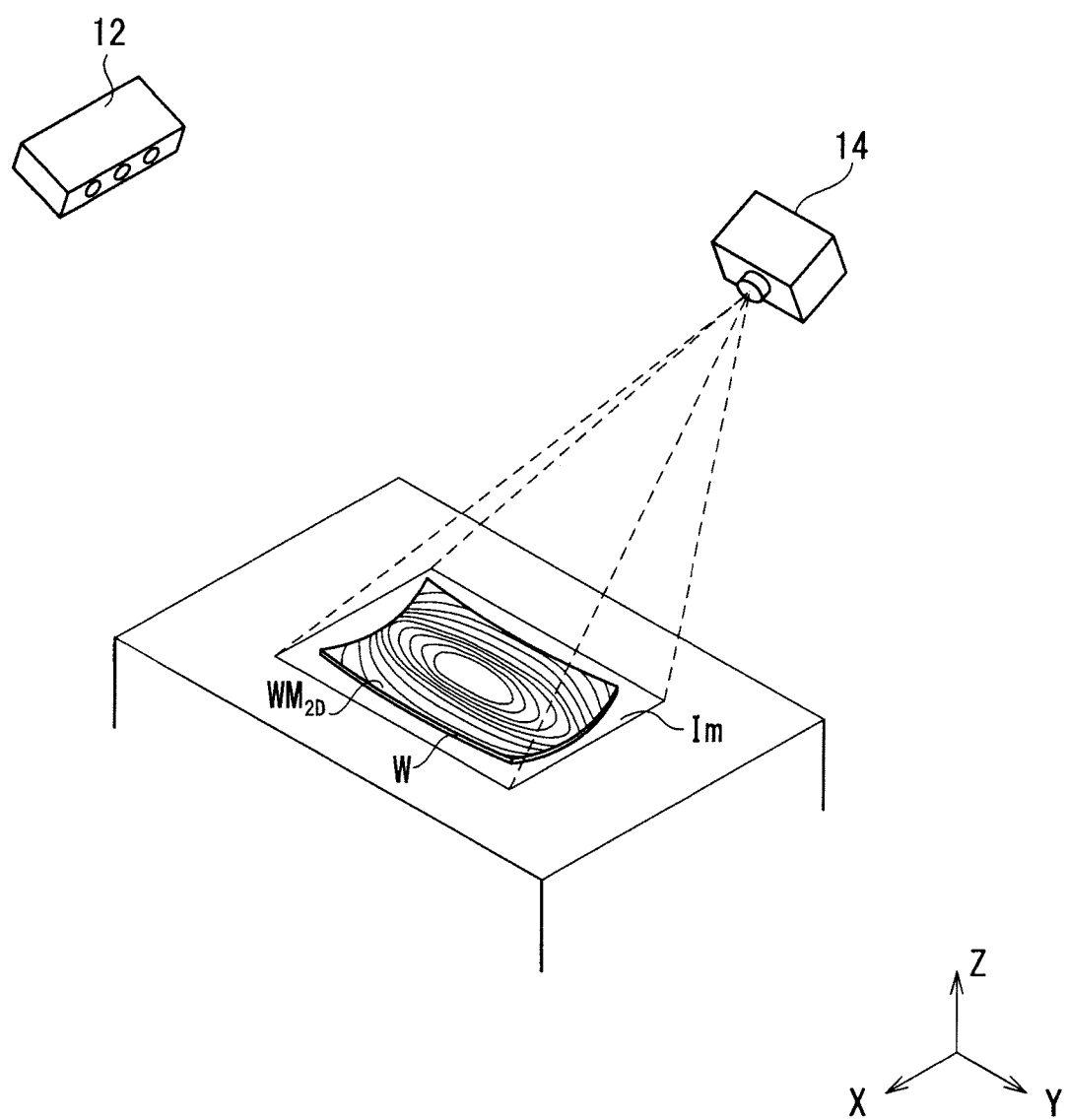
FIG. 15 is a perspective view of the work support system in a state with a two-dimensional picture of the 3D model of the workpiece overlaid on the workpiece.

The projection image creating part 158 of the arithmetic apparatus 116 creates a projection image of the projector apparatus 14 including the two-dimensional picture of the 3D model WM created by the 3D model two-dimensional picture creating part 156. Specifically, as shown in FIG. 15, the projection image Im is created such that when the projector apparatus 14 projects the image onto the workpiece W, a two-dimensional picture $WM_{2D}$ of the 3D model WM is overlaid on the workpiece W.

Figure 16:
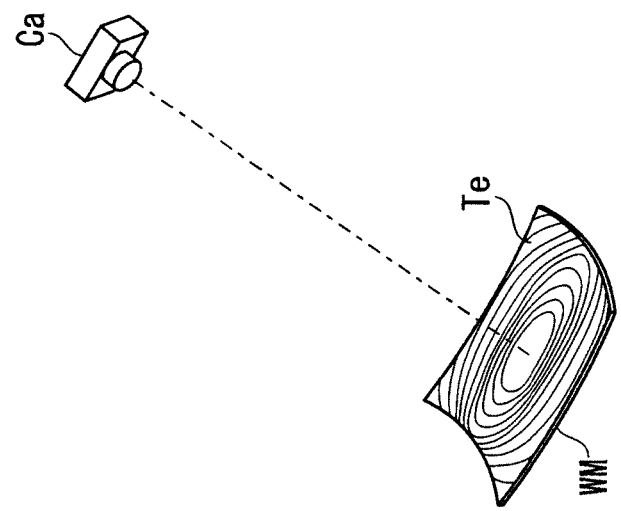
FIG. 16 is a view showing a concept of the work support system according to the second embodiment.
Figure 16:
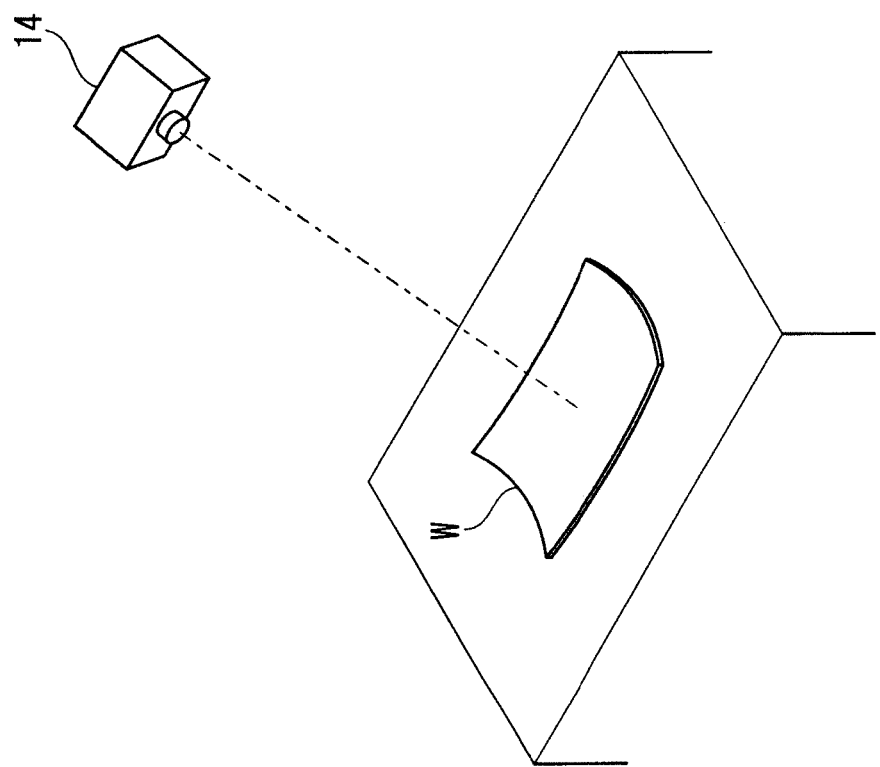

The concept of the second embodiment as described above is based on the following idea of the inventor. As shown in FIG. 16, it is assumed that a photographing direction of a camera Ca is equal to the projection direction of the projector apparatus 14 and that a distance between the camera Ca and the 3D model WM of the workpiece W is equal to a distance between the projector apparatus 14 and the workpiece W. In this case, if the projector apparatus 14 projects the image photographed by the camera Ca toward the workpiece W, the two-dimensional picture $WM_{2D}$ of the 3D model WM in the photographed image can be overlaid in a matched manner on the actual workpiece W.

To overlay the two-dimensional picture $WM_{2D}$ of the 3D model WM on the actual workpiece W, it may be necessary to appropriately set the projection magnification of the projector apparatus 14.

A flow of the work support of the work support system 110 according to the second embodiment having the configuration described above will be described with reference to a flowchart shown in FIG. 17.

Figure 17:
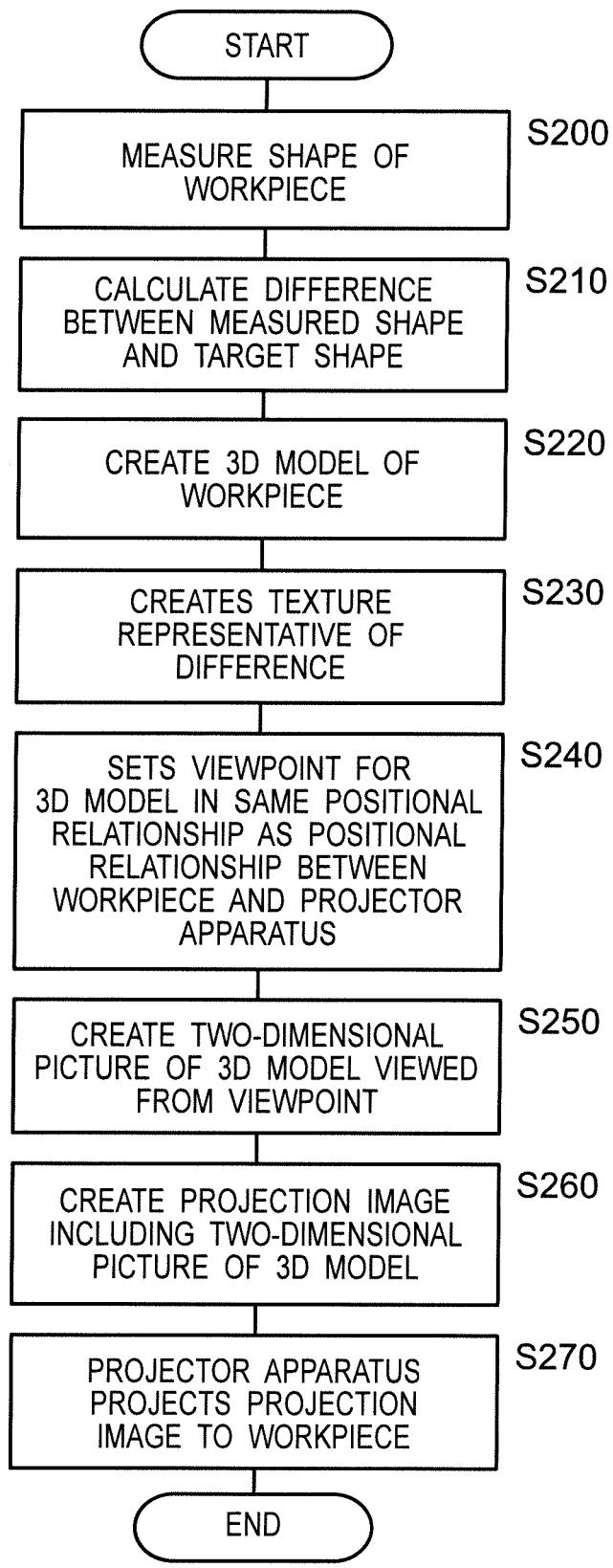
FIG. 17 is a flowchart showing a flow of work support of the work support system according to the second embodiment.

The work support of the work support system 110 shown in FIG. 17 is performed each time the worker completes one step for the workpiece W (e.g., a work of pressing one portion of the workpiece W), for example. Alternatively, the work support may be performed in accordance with a request from the worker.

As shown in FIG. 17, first, at first step S200, the shape of the workpiece W is measured by the three-dimensional measurement apparatus 12. As a result, the measured shape data of the workpiece W is acquired.

At step S210, the difference calculating part 150 of the arithmetic apparatus 116 calculates a difference between the measured shape data of the workpiece W measured and acquired at step S200 and the target shape data.

At step S220, the 3D model creating part 152 of the arithmetic apparatus 116 creates the 3D model WM of the workpiece W based on the measured shape data of the workpiece W acquired at step S200.

At step S230, the texture creating part 154 of the arithmetic apparatus 116 creates the texture Te that is the texture of the 3D model WM created at step S220 and that represents the difference. Specifically, the texture Te of the 3D model WM is created such that a characteristic point is drawn at a position of a measurement point on the 3D model WM corresponding to each of the multiple measurement points on the measured shape data of the workpiece W so as to represent the difference at the measurement point on the measured shape data.

At step S240, the 3D model two-dimensional picture creating part 156 sets a viewpoint for the 3D model WM of the workpiece W so as to achieve the same positional relationship as the positional relationship between the workpiece W and the projector apparatus 14.

At step S250, the 3D model two-dimensional picture creating part 156 of the arithmetic apparatus 116 creates the two-dimensional picture $WM_{2D}$ of the 3D model WM viewed from the viewpoint set at step S240.

At step S260, the projection image creating part 158 of the arithmetic apparatus 116 creates the projection image Im including the two-dimensional picture $WM_{2D}$ of the 3D model WM created at step S250.

At step S270, the projector apparatus 14 projects the projection image Im created at step S260 toward the workpiece W. As a result, the two-dimensional picture $WM_{2D}$ of the 3D model WM is overlaid in a matched manner on the workpiece W as shown in FIG. 15.

According to the second embodiment, as with the first embodiment, the worker's work on the workpiece can be supported so as to reduce a time required for the worker to determine details of work on the workpiece.

Although the present invention has been described with reference to the two embodiments, the embodiments of the present invention are not limited thereto.

For example, in the first embodiment described above, the projection image Im of the projector apparatus 14 is corrected when the picture Mpic of the second difference map M2 is offset relative to the object surface Ws of the workpiece W as shown in FIG. 10; however, the embodiments of the present invention are not limited thereto. A trapezoidal correction function, a projection magnification adjustment function, an optical axis adjustment function, etc. included in the projector apparatus 14 may be used instead of correction of the projection image so that the picture of the second difference map is overlaid on the object surface of the workpiece.

In the case of the first embodiment described above, to calculate the image conversion matrix for correcting the projection image, the worker performs the calibration work for adjusting the projection image Im such that the picture Mpic of the second difference map M2 is overlaid on the object surface Ws of the workpiece W. However, the embodiments of the present invention are not limited thereto. For example, a workpiece may be photographed by a camera to allow an arithmetic apparatus to perform image recognition of a contour shape of an object surface of the workpiece shown in the photographed image, and the projection image may be corrected such that the second difference map matches the contour shape recognized through the image recognition.

Figure 18:
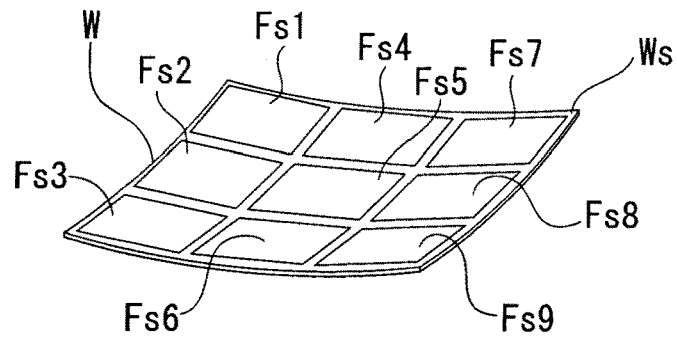
FIG. 18 is a view for explaining a work support method when the object surface of the workpiece is a curved surface.

In the case of the first embodiment described above, the object surface Ws of the workpiece W is basically flat; however, the embodiments of the present invention are not limited thereto. The object surface of the workpiece may be a curved surface. For example, when the object surface Ws of the workpiece W is a curved surface as shown in FIG. 18, the object surface Ws is considered as being made up of multiple flat surfaces Fs1 to Fs9, and the second difference map is created for each of the multiple flat surfaces Fs1 to Fs9. A projection image including the multiple second difference maps is then created. As a result, even when the object surface Ws of the workpiece is a curved surface, the work support system can support the worker's work on the workpiece in the same way.

Furthermore, in the case of the embodiments described above, as shown in FIG. 2, the projector apparatus 14 projects the projection image Im toward the workpiece W so as to overlay the picture Mpic of the second difference map M2 on the object surface Ws of the workpiece W that is stopped or that is not repositioned. However, the embodiments of the present invention are not limited thereto.

For example, if the object surface of the workpiece is present within a maximum projection range of the projector apparatus, the workpiece may continue to move or may be repositioned.

Figure 19:
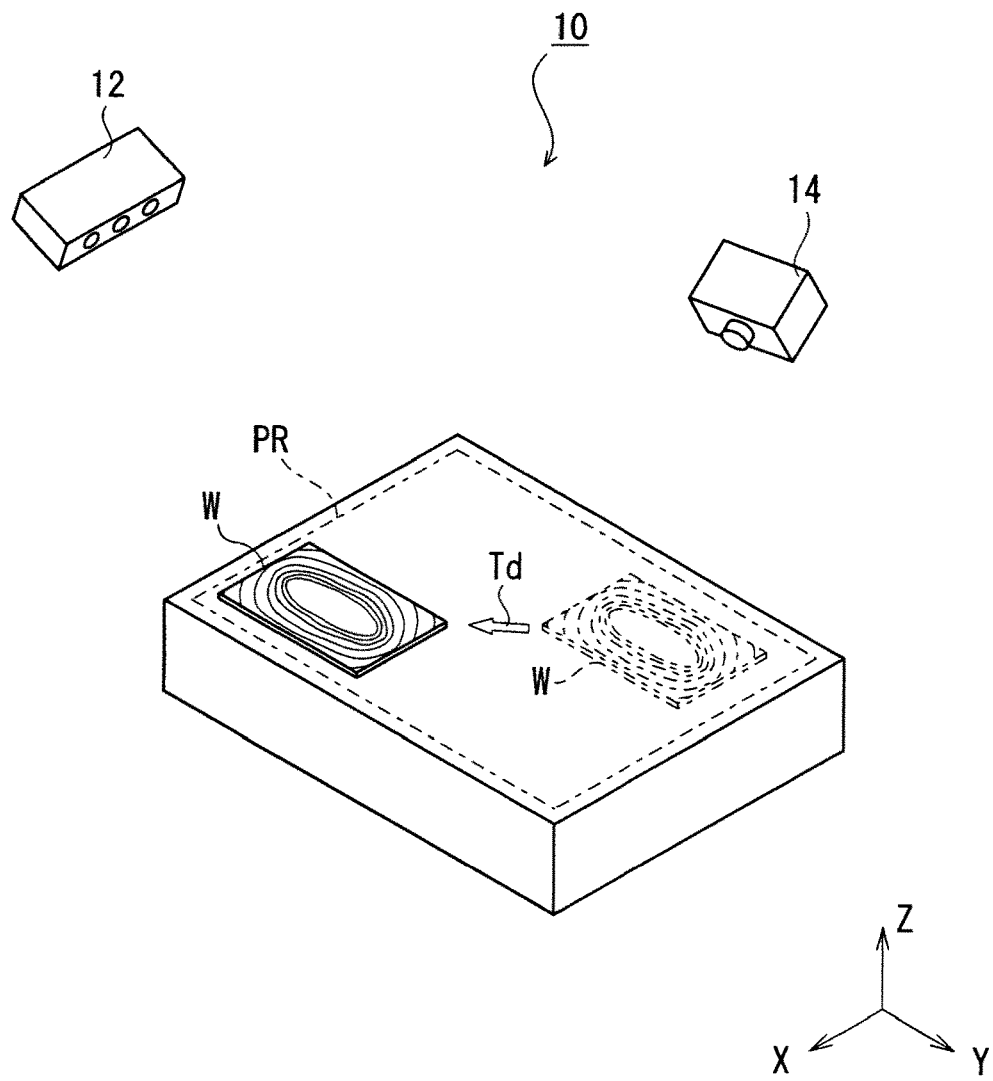
FIG. 19 is a perspective view for explaining a case that the workpiece moves.
Figure 20:
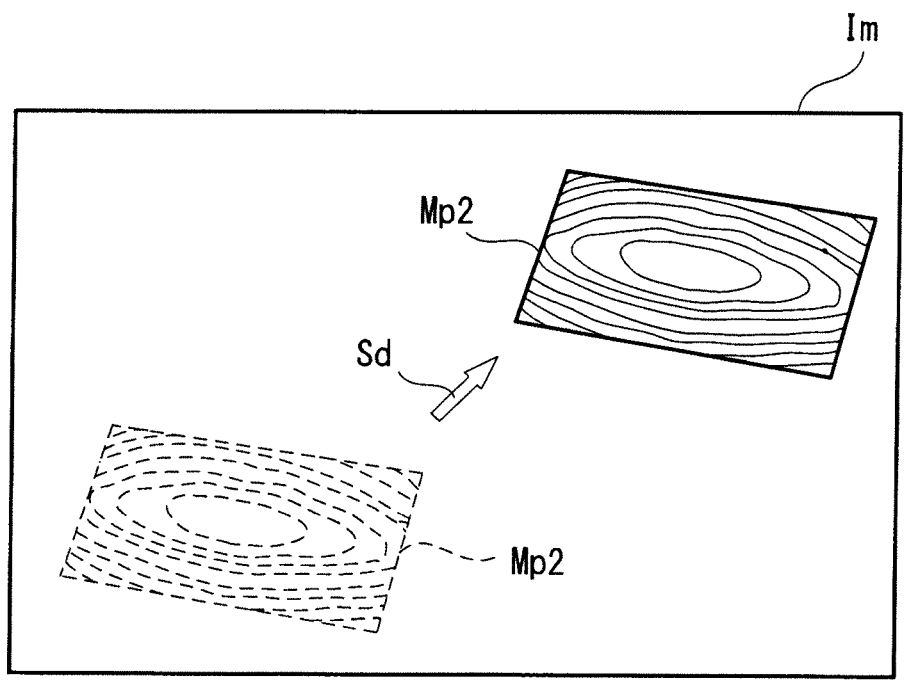
FIG. 20 is a view for explaining a projection image when the workpiece moves.

If the workpiece W moves within a maximum projection range PR of the projector apparatus 14 as shown in FIG. 19, the picture of the second difference map M2 can continuously be overlaid on the object surface of the moving workpiece W by shifting the position of the second difference map M2 in the projection image Im of the projector apparatus 14 as shown in FIG. 20. To this end, it is required to preliminarily examine a correspondence relationship in terms of a movement direction Td and a movement amount (movement speed) of the workpiece W and a shift direction Sd and a shift amount (shift speed) of the second difference map M2 in the projection image Im. For example, a relationship is preliminarily examined between a coordinate system in a space where the workpiece W exists and a coordinate system in the photographed image. As a result, even if the position of the workpiece is changed or the workpiece is moving, the picture of the second difference map can continuously be overlaid on the object surface of the workpiece.

Additionally, in the case of the embodiments described above, the difference map is an image for presenting to the worker a difference between the measured shape of the workpiece measured by the three-dimensional measurement apparatus and the target shape; however, the embodiments of the present invention are not limited thereto.

For example, the difference map may be an image for presenting to the worker a difference between a temperature distribution on the object surface of the workpiece measured by a temperature measurement apparatus, for example, a thermographic camera, and a target temperature distribution (e.g., a temperature distribution to be achieved). In this case, a temperature distribution image taken by the thermographic camera corresponds to the first difference map.

Therefore, in a broad sense, an aspect of the present invention provides a work support system supporting a worker's work on a workpiece, comprising a measurement apparatus measuring a state of each of multiple measurement points on an object surface of the workpiece, a projector apparatus arranged at a position different from the measurement apparatus such that the object surface is present within a projection range, and an arithmetic apparatus creating a projection image of the projector apparatus based on a measurement result of the measurement apparatus, wherein the arithmetic apparatus calculates a difference between a state measured by the measurement apparatus and a target state for each of the multiple measurement points, and wherein the arithmetic apparatus creates the projection image such that a picture of a characteristic point representative of the difference at each of the multiple measurement points is projected by the projector apparatus at a position of a corresponding measurement point on the object surface of the workpiece.

In a broad sense, another aspect of the present invention provides a work support method of supporting a worker's work on a workpiece, comprising measuring a state of each of multiple measurement points on an object surface of the workpiece with a measurement apparatus, and creating based on a measurement result of the measurement apparatus a projection image of a projector apparatus arranged at a position different from the measurement apparatus such that the object surface is present within a projection range, wherein the projection image is created by calculating a difference between a state measured by the measurement apparatus and a target state for each of the multiple measurement points, and creating the projection image such that a picture of a characteristic point representative of the difference at each of the multiple measurement points is projected by the projector apparatus at a position of a corresponding measurement point on the object surface of the workpiece.

Lastly, as a supplement, when the measurement apparatus is a three-dimensional measurement apparatus, the "first view direction of the measurement apparatus to the object surface" is not limited to an extending direction of a straight line extending from the three-dimensional measurement apparatus toward the object surface. For example, a three-dimensional measurement apparatus such as a 3D laser scanner can measure a position of each of multiple measurement points on an object surface of a workpiece, i.e., can acquire a three-dimensional shape (data) of the object surface. The acquired three-dimensional shape can be projected and converted into a plane orthogonal to the view direction as long as the entire object surface of the workpiece is visible in the view direction. Therefore, the first difference map can be created from multiple different viewpoints of the three-dimensional measurement apparatus depending on a shape of the object surface of the workpiece. Thus, when the measurement apparatus is a three-dimensional measurement apparatus, the "first view direction of the measurement apparatus to the object surface" includes multiple view directions in which the entire object surface is visible.

INDUSTRIAL APPLICABILITY

The present invention enables support of a work performed on a workpiece by a worker and requiring the worker to periodically or intermittently know a state of the workpiece.

The invention claimed is:

1. A work support system supporting a worker's work on a workpiece, the work support system comprising:
   a measurement apparatus measuring a position of each of multiple measurement points on an object surface of the workpiece;
   a projector apparatus arranged at a position different from the measurement apparatus such that the object surface is present within a projection range; and
   an arithmetic apparatus creating a projection image of the projector apparatus based on a measurement result of the measurement apparatus, wherein
   the arithmetic apparatus calculates a difference between a shape measured by the measurement apparatus and a target shape for each of the multiple measurement points,
   the arithmetic apparatus creates the projection image such that a picture of a characteristic point representative of the difference for each of the multiple measurement points is projected by the projector apparatus at a position for a corresponding measurement point on the object surface of the workpiece, and
   the arithmetic apparatus includes
      a difference map creating part calculating the difference between the shape measured by the measurement apparatus and the target shape for each of the multiple measurement points and creating a first difference map from the viewpoint of the measurement apparatus acquired by imaging a distribution of difference on the object surface as an image on a first plane orthogonal to a first view direction of the measurement apparatus to the object surface,
      a difference map converting part performing image conversion of the first difference map based on a positional relationship between the measurement apparatus and the projector apparatus into an image on a second plane orthogonal to a second view direction of the projector apparatus to the object surface and thereby creating a second difference map from the viewpoint of the projector apparatus, and
      a projection image creating part creating the projection image including the second difference map so that a picture of the second difference map is overlaid on the object surface.

2. The work support system according to claim 1, wherein the arithmetic apparatus includes a projection image correcting part correcting the projection image through image conversion so that the picture of the second difference map is overlaid in a matched manner on the object surface.

3. The work support system according to claim 2, wherein the arithmetic apparatus includes
   an input part for the worker adjusting the projection image so that the picture of the second difference map is overlaid in a matched manner on the object surface, and
   a correction conversion matrix calculating part calculating an image conversion matrix used for image conversion of the projection image based on the projection image before being adjusted by the worker and the projection image after being adjusted.

4. The work support system according to claim 3, comprising at least four markers detachably attached to the object surface and used as a reference for alignment for the worker overlaying the picture of the second difference map in a matched manner on the object surface.

5. A work support system supporting a worker's work on a workpiece, the work support system comprising:
   a measurement apparatus measuring a position of each of multiple measurement points on an object surface of the workpiece;
   a projector apparatus arranged at a position different from the measurement apparatus such that the object surface is present within a projection range; and
   an arithmetic apparatus creating a projection image of the projector apparatus based on a measurement result of the measurement apparatus, wherein
   the arithmetic apparatus calculates a difference between a shape measured by the measurement apparatus and a target shape for each of the multiple measurement points,
   the arithmetic apparatus creates the projection image such that a picture of a characteristic point representative of the difference for each of the multiple measurement points is projected by the projector apparatus at a position for a corresponding measurement point on the object surface of the workpiece, and
   the arithmetic apparatus includes
      a difference calculating part calculating the difference between the shape measured by the measurement apparatus and the target shape for each of the multiple measurement points,
      a 3D model creating part creating a 3D model of the workpiece having the shape measured by the measurement apparatus,
      a texture creating part creating a texture of the 3D model in which a characteristic point representative of the difference at each of the multiple measurement points is drawn at the position for the corresponding measurement point on the 3D model,
      a 3D model image creating part setting a viewpoint for the 3D model so as to achieve the same positional relationship as the positional relationship of the projector apparatus relative to the workpiece, and creating a two-dimensional picture of the 3D model viewed from the viewpoint, and a projection image creating part creating the projection image including the two-dimensional picture of the 3D model such that the two-dimensional picture of the 3D model is overlaid on the workpiece.

6. The work support system according to claim 1, wherein the measurement apparatus is a three-dimensional measurement apparatus measuring the position of each of the multiple measurement points on the object surface of the workpiece.

7. The work support system according to claim 6, wherein the projector apparatus is arranged in a measurement range of the three-dimensional measurement apparatus, and wherein the arithmetic apparatus calculates a positional relationship between the three-dimensional measurement apparatus and the projector apparatus based on a position of the projector apparatus measured by the three-dimensional measurement apparatus.

8. A work support method of supporting a worker's work on a workpiece, the work support method comprising:

measuring a position of each of multiple measurement points on an object surface of the workpiece with a measurement apparatus; and creating, based on a measurement result of the measurement apparatus, a projection image of a projector apparatus arranged at a position different from the measurement apparatus such that the object surface is present within a projection range, wherein the projection image is created by calculating a difference between a shape measured by the measurement apparatus and a target shape for each of the multiple measurement points, creating the projection image such that a picture of a characteristic point representative of the difference for each of the multiple measurement points is projected by the projector apparatus at a position for a corresponding measurement point on the object surface of the workpiece, creating a first difference map from the viewpoint of the measurement apparatus acquired by imaging a distribution of the difference on the object surface as an image on a first plane orthogonal to a first view direction of the measurement apparatus to the object surface, performing image conversion of the first difference map based on a positional relationship between the measurement apparatus and the projector apparatus into an image on a second plane orthogonal to a second view direction of the projector apparatus to the object surface and thereby creating a second difference map from the viewpoint of the projector apparatus, and creating the projection image including the second difference map so that a picture of the second difference map is overlaid on the object surface.

9. The work support method according to claim 8, wherein the projection image is corrected through image conversion so that the picture of the second difference map is overlaid in a matched manner on the object surface.

10. The work support method according to claim 9, wherein the projection image is adjusted so that the picture of the second difference map is overlaid in a matched manner on the object surface, and wherein an image conversion matrix used for image conversion of the projection image is calculated based on the projection image before being adjusted and the projection image after being adjusted.

11. The work support method according to claim 10, wherein at least four markers are detachably attached to the object surface, and wherein the least four markers are used as a reference for alignment for overlaying the picture of the second difference map in a matched manner on the object surface.

12. A work support method of supporting a worker's work on a workpiece, the work support method comprising:

measuring a position of each of multiple measurement points on an object surface of the workpiece with a measurement apparatus; and creating, based on a measurement result of the measurement apparatus, a projection image of a projector apparatus arranged at a position different from the measurement apparatus such that the object surface is present within a projection range, wherein the projection image is created by calculating a difference between a shape measured by the measurement apparatus and a target shape for each of the multiple measurement points, creating the projection image such that a picture of a characteristic point representative of the difference at each of the multiple measurement points is projected by the projector apparatus at a position for a corresponding measurement point on the object surface of the workpiece, creating a 3D model of the workpiece having the shape measured by the measurement apparatus, creating a texture of the 3D model in which a characteristic point representative of a difference at each of the multiple measurement points is drawn at the position for the corresponding measurement point on the 3D model, setting a viewpoint for the 3D model so as to achieve the same positional relationship as the positional relationship of the projector apparatus relative to the workpiece, creating a two-dimensional picture of the 3D model viewed from the viewpoint, and creating the projection image including the two-dimensional picture of the 3D model such that the two-dimensional picture of the 3D model is overlaid on the workpiece.

13. The work support method according to claim 8, wherein the measurement apparatus is a three-dimensional measurement apparatus measuring the position of each of the multiple measurement points on the object surface of the workpiece.

14. The work support method according to claim 13, wherein the projector apparatus is arranged in a measurement range of the three-dimensional measurement apparatus, and wherein a positional relationship between the three-dimensional measurement apparatus and the projector apparatus is calculated based on a position of the projector apparatus measured by the three-dimensional measurement apparatus.

* * * * *